United States Patent

Bourgeois

[11] 4,123,289
[45] Oct. 31, 1978

[54] AUTOMATIC PICK-UP AND RELEASE MECHANISM AND AGITATOR DEVICE

[76] Inventor: Ronald D. Bourgeois, 38 Ellison Park, Waltham, Mass. 02154

[21] Appl. No.: 812,616

[22] Filed: Jul. 5, 1977

[51] Int. Cl.² .............................................. B08B 3/04
[52] U.S. Cl. .................................... 134/134; 134/194; 99/407; 198/518; 198/692; 198/693; 209/78; 366/276
[58] Field of Search .................. 99/407, 409; 366/276; 209/77-78; 134/133-134, 163-164, 187-188, 194, 66-67; 198/518, 692-693

[56] References Cited

U.S. PATENT DOCUMENTS

| 1,657,310 | 1/1928 | Maggio | 134/164 UX |
| 2,637,074 | 5/1953 | Gardes | 198/692 X |
| 2,706,032 | 4/1955 | Kowalik | 198/518 X |
| 2,733,724 | 2/1956 | Warren | 134/134 |

OTHER PUBLICATIONS 118,443   3/1947   Sweden ........................ 134/194

Primary Examiner—Robert L. Bleutge
Attorney, Agent, or Firm—Joseph S. Iandiorio

[57] ABSTRACT

An automatic pick-up and release mechanism including a curved surface having an axis of curvature; a rotatable shaft having an axis parallel with and eccentric to the axis of curvature; at least one pick-up element extending radially from and fixed to rotate with the shaft; each element extending beyond the curved surface in an area of the curved surface which is closer to the shaft axis and short of the curved surface in an area farther from the shaft axis; and a slot, corresponding to each of the elements in the curved surface, extending circumferentially about the axis of curvature for accommodating motion of its associated element.

1 Claim, 3 Drawing Figures

AUTOMATIC PICK-UP AND RELEASE MECHANISM AND AGITATOR DEVICE

FIELD OF INVENTION

This invention relates to an automatic pick-up and release mechanism, and to an agitator device and to a pick-up and release system including both.

BACKGROUND OF INVENTION

In many industries it is desirable to have a simple automated mechanism for picking up annular or at least primarily annular items from a stock of such items and depositing them on a conveyor or other transfer or production machines. For example, in the food industry it is necessary to deliver continuously and at a uniform flow rate wetted onion rings for breading and packaging for shipment to restaurants and food markets. In the past the onion rings have been wetted and delivered for breading by human operators. This often leads to less than uniform wetting and to a sporadic rather than uniform flow rate of the rings to the breading and packaging machines. The result of such handling is often improper breading, either too much or too little, and overloading of the breading machines, which leads to spillage, spoilage, clogging, and breaking of the onion rings; and the use of human operators adds considerably to the production cost.

SUMMARY OF INVENTION

It is an object of this invention to provide an improved, simplified, inexpensive and extremely effective automatic pick-up and release mechanism.

It is a further object of this invention to provide such a mechanism which works well to handle primarily annular goods.

It is a further object of this invention to provide an improved, simplified, inexpensive and extremely effective agitator device.

It is a further object of this invention to provide an improved, simplified, inexpensive and extremely effective automatic pick-up and release system including an automatic pick-up and release mechanism and an agitator device.

The invention results from the realization that an extremely simple and effective pick-up and release mechanism can be constructed using one or more elements mounted on a rotatable shaft for picking up items and a curved surface with an axis of curvature eccentric to the axis of the shaft for releasing or wedging the items from the pick-up elements, and that the items may be kept agitated in a fluid by a swash plate assembly.

This invention features an automatic pick-up and release mechanism including a curved surface having an axis of curvature and a rotatable shaft having an axis parallel with and eccentric to the axis of curvature. There is at least one pick-up element extending radially from and fixed to rotate with the shaft. Each element extends beyond the curved surface in an area of the curved surface which is closer to the shaft axis and short of the curved surface in an area farther from the shaft axis. A slot, corresponding to each of the elements, is provided in the curved surface extending circumferentially about the axis of curvature for accommodating motion of the associated element.

The invention also features an agitator device for a fluid container including a swash plate and a support structure in the container for swingably supporting one edge of the swash plate. There are drive means and link means interconnecting the drive means and the swash plate for reciprocally rotating the swash plate about its edge supported by the support structure.

The invention also features an automatic pick-up and release system which includes the pick-up and release mechanism and agitator device in combination.

DISCLOSURE OF PREFERRED EMBODIMENT

Other objects, features and advantages will occur from the following description of a preferred embodiment and the accompanying drawings, in which.

This invention may be accomplished using a curved surface which may be an open curved surface, such as a portion of a cylinder, or a closed or cylindrical surface, formed by a drum or by a plurality of spaced disks. There is a rotatable shaft whose axis is parallel with and eccentric to the axis of curvature of the drum or disk type cylindrical surface or the open curved surface. On the shaft there is at least one pick-up element extending radially outward and fixed to rotate with the shaft. Each of the elements extends beyond the curved surface in an area of the curved surface which is closer to the shaft axis, and extends short of the curved surface in an area farther from the shaft axis. A slot is provided in the curved surface, one slot corresponding to each of the elements. The slots extend circumferentially about the axis of curvature and accommodate the motion of their respective associated elements.

There is an agitator device for keeping in motion the fluid in a container. The agitator device includes a swash plate and a support structure within the container for swingably supporting one edge of the swash plate. There are drive means which may be the same drive means which are used to rotate the shaft of the pick-up and release mechanism, and there are link means interconnecting the drive means and the swash plate for reciprocally rotating the swash plate about its edge supported by the support structure.

Figure 1:
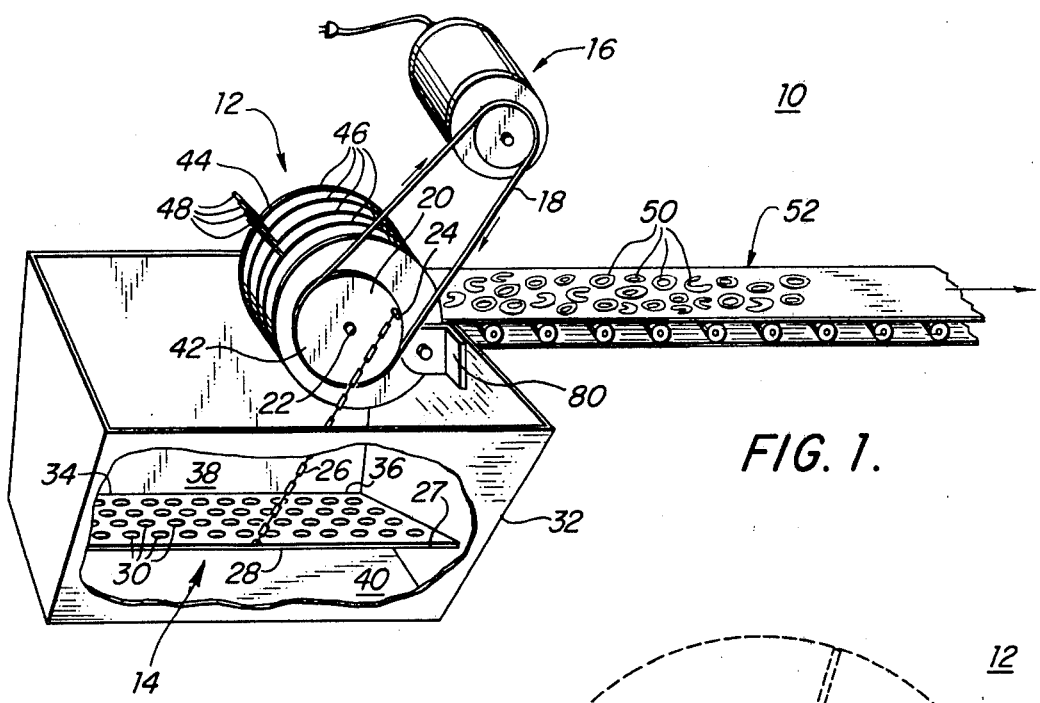
FIG. 1 is a simplified axonometric view of an automatic pick-up and release system according to this invention.

There is shown in FIG. 1 a pick-up and release system 10 including a pick-up and release mechanism 12 and agitator device 14, both of which are driven by a motor 16 via belt 18.

Pulley wheel 20, mounted on shaft 22, is driven by belt 18 and includes an eccentric pin 24, to which is fastened link means, chain 26, whose other end is attached near the free end 27 of swash plate 28 of agitator device 24. Swash plate 28 includes perforations 30 to facilitate movement through and agitation of the fluid which fills container 32. Swash plate 28 is supported at its edge 34 by a support structure normally or specially provided, such as the corner or junction 36 of a wall 38 and the base 40 of container 32.

Shaft 22 is carried in bearings, not shown, in end plates 42, only one of which is shown, of drum 44 of mechanism 12. Attached to shaft 22, and protruding through circumferential slots 46 of drum 44, are pick-up elements or pins 48 which pick up items, i.e. annular parts such as onion rings, carry them about the top of drum 44, and drop these rings, or parts of rings 50, onto a transfer device such as conveyor 52, which moves them to other machinery for processing or packaging.

Figure 2:
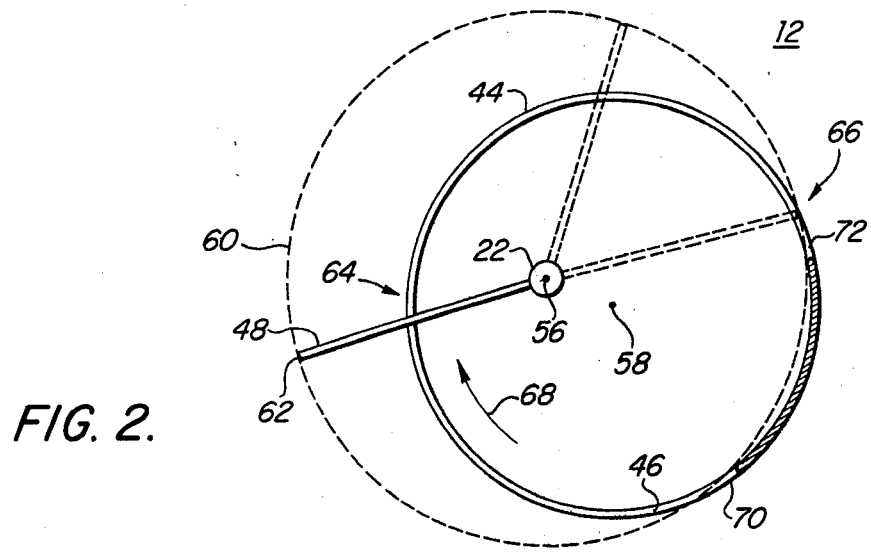
FIG. 2 is a diagrammatic, sectional end view of a cylinder type pick-up and release mechanism according to this invention.

Shaft 22 has its axis 56, FIG. 2, eccentric to the axis of curvature 58 of the curved surface constituted by cylinder or drum 44. As a result of this eccentricity, the ends of pins 48 move in a path indicated by the dashed line 60. The tips 62 of pins 48 thus extend well beyond the edge of the curved surface of drum 44, in the area where eccentric axis 56 is closest to that surface, such as in the area 64, and withdraw below that surface in the area that is indicated at 66, where eccentric axis 56 is farther from the curved surface of drum 44. Thus, as shaft 22 rotates in a clockwise direction as indicated by arrow 68, the tips of pins 48 move through the surface of drum 44 as they pass through the beginning 70 of slots 46, subsequent to which they are available to penetrate and then lift the primarily annular items such as onion rings, and carry them about the curved surface of drum 44 until they reach the far side in the area 66 where, as the pins re-enter through the surface of drum 44 at the end 72 of slots 46, the onion rings or other items are wedged from the pins and dropped onto a conveyor belt or other device. There may be more than one row of pins 48, and they need not be aligned in any particular fashion. They may be randomly oriented along and about shaft 22, or they may be helically or otherwise regularly mounted about it.

Figure 3:
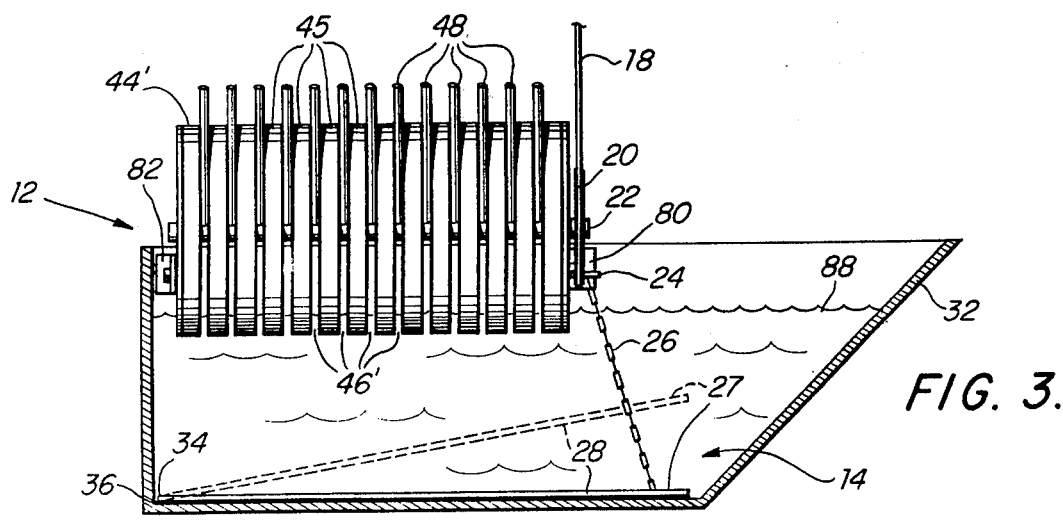
FIG. 3 is a diagrammatic side view of the system of FIG. 1, showing the container, or tank, in section and showing an alternative disk construction of the pick-up and release mechanism.

Alternatively, pick-up and release mechanism 12 may be made in the form of a cylinder or drum 44', FIG. 3, which consists of a plurality of solid side-by-side disks 45 with spaces between them to form slots 46' to accommodate the motion of pins 48. Cylinders or drums 44 and 44' may be attached to the side of tank or container 32, FIGS. 1 and 3, by means of L-shaped pieces 80 and 82, which are welded or bolted to the drum and tank.

In operation, when a supply of onion rings has been deposited in water 88, FIG. 3, motor 16 drives pulley wheel 22, FIG. 1–3, by means of pulley 18. Pulley wheel 20 rotates shaft 22 in a clockwise direction, causing fingers 48 to sweep out and up, as shown in FIG. 2, spearing onion rings on pins 48 and lifting them up over the surface of drum 44 or 44', and releasing them onto conveyor 52. While pulley wheel 20 continues to rotate shaft 22, eccentric pin 24 alternately raises and lowers the forward edge 27 of slide plate 28 in order to agitate the water and keep the onion rings flowing and bobbing about for greater availability to pins 48.

Other embodiments will occur to those skilled in the art and are within the following claims:

What is claimed is:

1. An automatic pick-up and release system for handling annular and quasi-annular items presented in a fluid and depositing them on a conveyor comprising:
a fluid container for holding fluid containing said items;
an automatic pick-up and release mechanism including a curved surface fixed with said container and having an axis of curvature; a rotatable shaft having an axis parallel and eccentric to said axis of curvature; at least one pick-up element extending radially from and fixed to rotate with said shaft; each said element extending beyond said curved surface and into said fluid for spearing the items and extending short of said curved surface proximate the conveyor for releasing and depositing said items on the conveyor in an area farther from said shaft axis; a slot, corresponding to each of said elements in said curved surface, extending circumferentially about said axis of curvature for accommodating motion of its associated said element; and
an agitator device in said fluid container including a swash plate; a support structure in said container for swingably supporting one edge of said swash plate; drive means; and link means, interconnecting said drive means and said swash plate for reciprocally rotating said swash plate about its edge supported by said support structure for agitating the fluid and keeping in motion the items to be speared by said elements.

* * * * *